(No Model.) 7 Sheets—Sheet 1.

A. H. LIGHTHALL.
COMBINED HEADER AND THRASHER.

No. 243,715. Patented July 5, 1881.

WITNESSES
Wilmer Bradford
E. A. Smith

INVENTOR
A. H. Lighthall
By C. W. M. Smith, atty.

(No Model.) 7 Sheets—Sheet 4.

A. H. LIGHTHALL.
COMBINED HEADER AND THRASHER.

No. 243,715. Patented July 5, 1881.

WITNESSES
Wilmer Bradford
C. A. Smith

INVENTOR
A H Lighthall
By C W M Smith
Attorney

(No Model.) 7 Sheets—Sheet 5.

A. H. LIGHTHALL.
COMBINED HEADER AND THRASHER.

No. 243,715. Patented July 5, 1881.

WITNESSES
Wilmer Bradford
C. A. Smith

INVENTOR
A. H. Lighthall
By C. W. M. Smith
Attorney (No Model.) 7 Sheets—Sheet 6.

A. H. LIGHTHALL.
COMBINED HEADER AND THRASHER.

No. 243,715. Patented July 5, 1881.

WITNESSES
Wilmer Bradford
C. A. Smith

INVENTOR
A. H. Lighthall
By C. W. M. Smith, Atty.

(No Model.) 7 Sheets—Sheet 7.

A. H. LIGHTHALL.
COMBINED HEADER AND THRASHER.

No. 243,715. Patented July 5, 1881.

WITNESSES
Wilmer Bradford
C. A. Smith.

INVENTOR
A. H. Lighthall
By C. W. M. Smith
Attorney

UNITED STATES PATENT OFFICE.

ALMERIN H. LIGHTHALL, OF SAN FRANCISCO, CALIFORNIA, ASSIGNOR OF ONE-HALF TO PETER TAYLOR, OF SAME PLACE.

COMBINED HEADER AND THRASHER.

SPECIFICATION forming part of Letters Patent No. 243,715, dated July 5, 1881.

Application filed September 20, 1880. (No model.)

*To all whom it may concern:*

Be it known that I, ALMERIN H. LIGHTHALL, a citizen of the United States, residing at San Francisco, in the county of San Francisco and State of California, have invented a certain new and useful Combined Header and Thrasher, of which the following is a specification.

My invention relates to improvements in combined headers and thrashers, in which the thrasher may be detached from the header, and, each being a complete machine in itself, may be used separately and independently of the other; and it further relates to certain details of construction, which will be hereinafter more fully explained.

The objects of my improvements are, first, to provide a means whereby the thrasher may be easily detached from the main frame-work of the header, and, being placed upon trucks in the usual manner, be run as a separate machine by making connection between a band-wheel and any suitable power-producing mechanism; second, to provide a means whereby the finger-bar, sickle-bar, and draper of the header may be raised and lowered at the will of the operator to suit the height of the grain, and at the same time be kept in a perfectly horizontal plane with the main frame, in order that when on level ground the stalks of the standing grain may be cut with a square cut and not with a beveled or sloping cut, and be evenly distributed upon the draper; third, to provide a main frame-work for the header, and upon which the thrasher rests, so constructed as to be easily detachable one part from the other when it may become necessary to do so for the purpose of transportation, or for making repairs; fourth, to construct and attach the push-bar in such a manner that a long and light beam is had, which may be easily attached to or detached from the machine; fifth, to provide an improved way of applying tension to the stay or truss rods on the ends of the main frame-work; and, lastly, to provide a steering-gear for the machine, the rudder-wheels of which are provided with a central flange projecting from the rim or tread. I attain these objects by the mechanism illustrated in the accompanying drawings, in which—

Similar letters refer to similar parts throughout the several views.

I construct the main frame A of my machine of angle-iron, in the form shown, and firmly bolted or riveted together. Upon the upper face of these angle-irons I bolt the boxes $a$, which receive the bearings of the gear and driving wheels which actuate the different parts of the machine.

Figure 16:
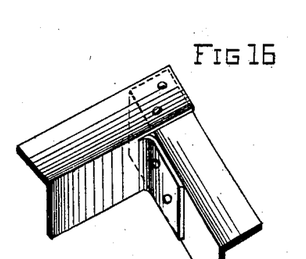
Fig. 16, Sheet 6, is a perspective view, showing the manner of making connection between two pieces of angle-iron.

The joint between two angle-irons I form in the manner shown in Fig. 16, a portion of one side of one angle-iron being flanged up, and this is bolted to the adjoining angle-iron, while bolts or rivets connect the straight side of one piece to the upper side of the piece adjoining. By this construction it will be seen that I obtain two bearing-surfaces without weakening any part of the structure, and one which may be cheaply and easily made.

Figures 19, 20:
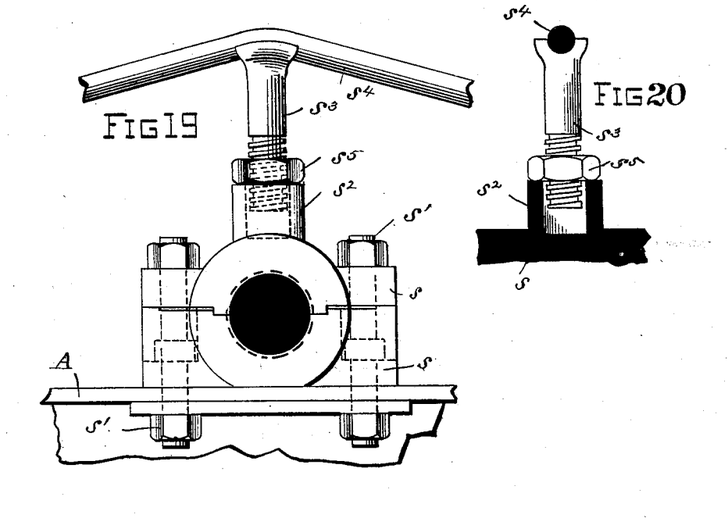
Fig. 19, Sheet 7, is an end view of the journal-box of main driving-wheels, showing the manner of applying tension to the truss-rods.
Fig. 20, detail view of journal-box.

The journal-boxes $a$, I construct in the form shown in Figs. 19 and 20—that is to say, they are made in two sections, $s\ s$, held together by set-bolts $s'$. Upon the upper face of the upper section I form a projection, $s^2$, as shown. This projection is hollowed out, so as to receive the lower end of a threaded set-bolt, $s^3$, which has its head hollowed out to receive the stay or truss rod $s^4$.

By turning the nut $s^5$ the depth to which the set-bolt enters the projection $s^2$ can be regulated, and consequently the truss-rod $s^4$ will be held in position more or less rigidly.

Figure 3:
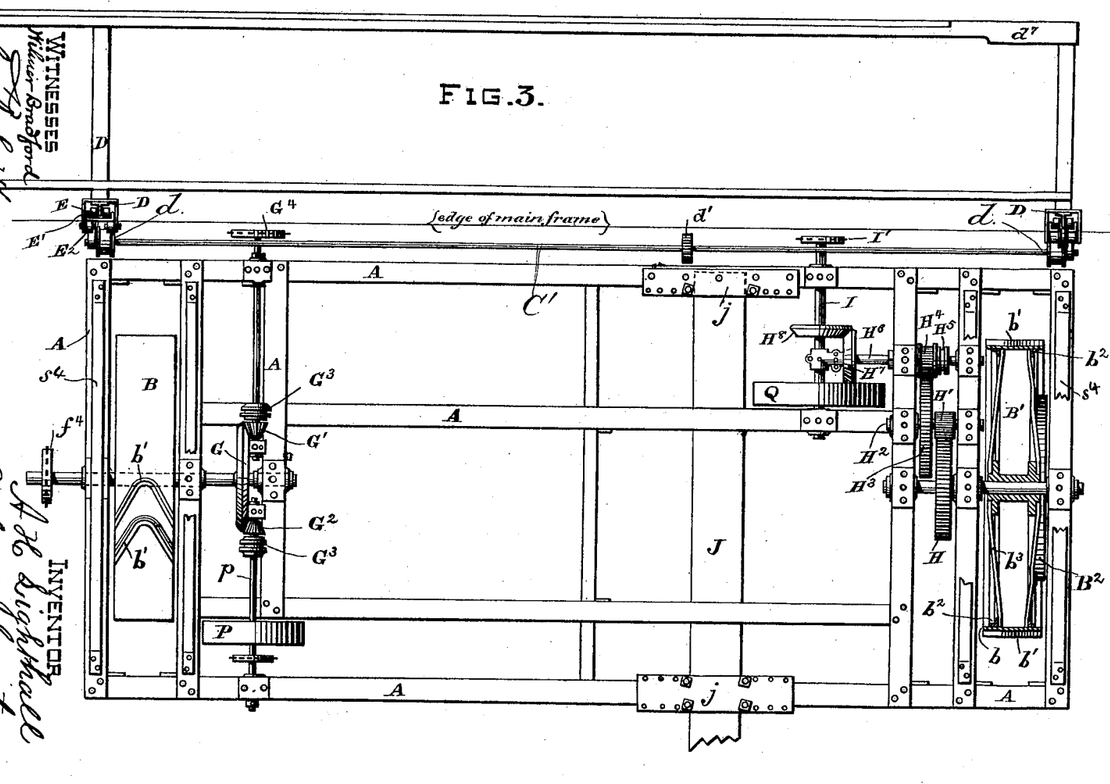
Fig. 3, Sheet 3, is a general plan of the main frame.

At each end of the main frame I place the driving-wheels B B', one of which is shown in section in Fig. 3, Sheet 3; but I do not herein claim the specific construction of the driving-wheels, reserving the right of making a separate application therefor.

At the front end of the end pieces composing the main frame I bolt angle-irons C C, which support the bearings for the shaft C', upon each end of which are keyed the two grooved pulleys $d\ d$ and spur-wheel $d'$.

Figures 4, 5, 6, 7:
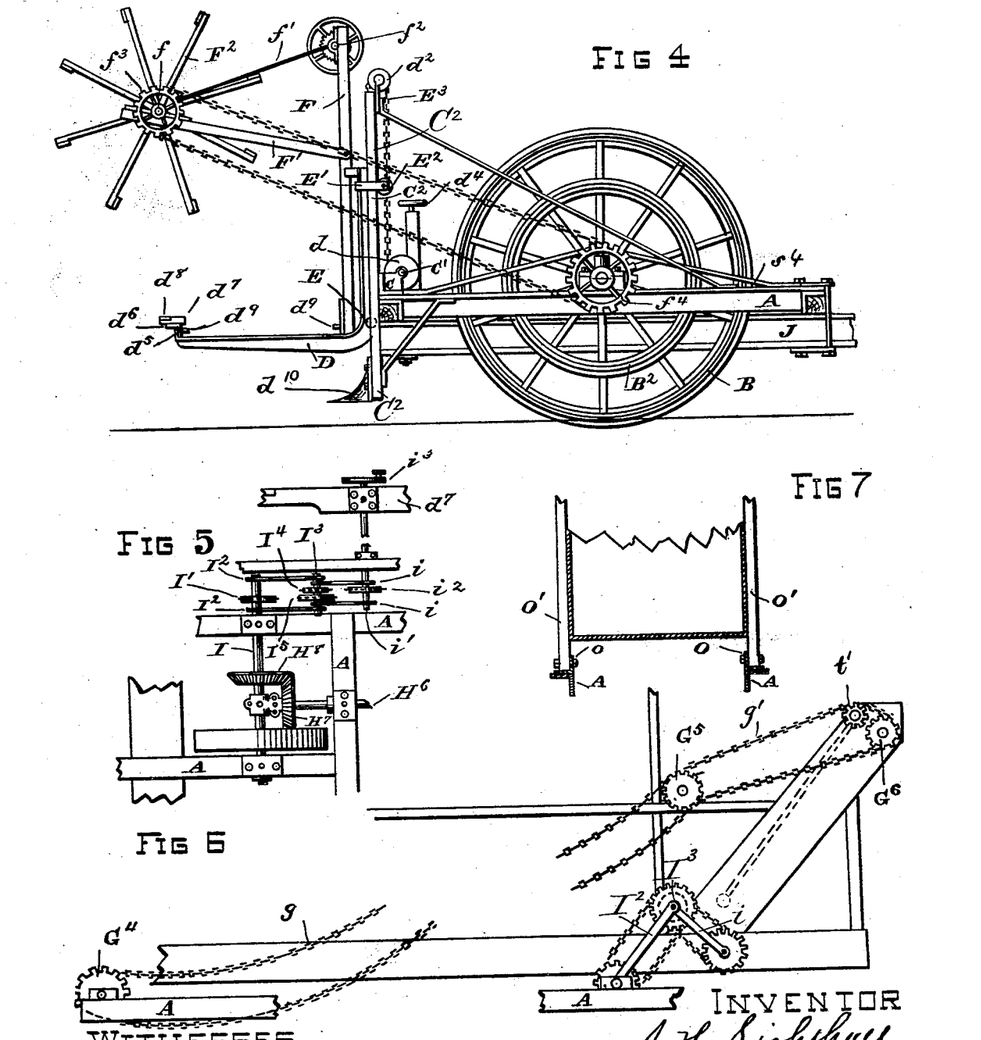
Fig. 4, Sheet 4, is a side view of the main frame, showing the elevating mechanism for the header and the manner of operating the reel thereof.
Fig. 5, Sheet 4, is a plan view, showing the manner of operating the sickle-bar.
Fig. 6, Sheet 4, shows the manner of operating the draper for the header by means of an intermediate chain-wheel.
Fig. 7, Sheet 4, shows the manner of attaching the thrasher to the main frame-work.
Figures 17, 18:
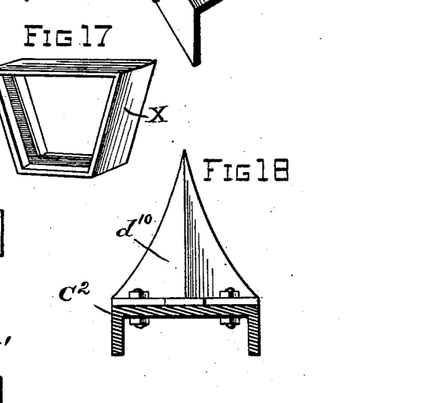
Fig. 17, Sheet 6, is a perspective view of inner box or brace for push-beam.
Fig. 18 is a top view of colter.

To the angle-iron C is bolted the vertical channel-iron or guide-piece $C^2$, which is braced by suitable stay-rods, and to its lower end I bolt a colter or double plow-point, $d^{10}$, as seen in side elevation, Fig. 4, and in plan in Fig. 18, Sheet 6, the office of this pilot or colter being to plow through or ward off any obstructions which might otherwise strike against the flat surface of the channel-iron $C^2$. At the top of this guide-piece I place a groove-pulley, $d^2$.

Figure 8:
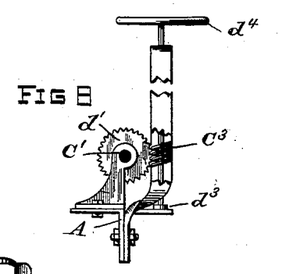
Fig. 8, Sheet 5, is a side view, partly broken away, showing the manner of operating the shaft of the wheels upon which the chain is wound, which raises and lowers the draper and sickle-bar of the header.
Figure 9:
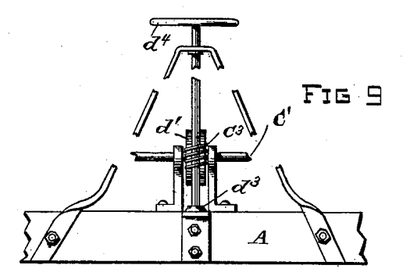
Fig. 9, Sheet 5, is a rear view of the same, partly broken away.

About midway between the two guide-pieces I bolt a step, $d^3$, Figs. 8 and 9, Sheet 5, which supports a worm-gear, $C^3$, the shaft of which is suitably braced, and the upper end provided with a hand-wheel, $d^4$. The frame D, Fig. 4, Sheet 4, which supports the heading apparatus of my machine, is formed of T-iron bent into the form shown, and has its outer end, $d^5$, turned up, and an angle-iron, $d^6$, which extends from one end of my machine to any desired distance past the opposite end, as seen in Fig. 3, Sheet 3, and to this angle-iron is bolted the timber $d^7$, to which is secured the finger-bar $d^8$, through which plays the sickle-bar. By this construction I prevent all warping of the finger-bar and its timber, and also prevent the binding of the knives of the sickle-bar upon the fingers; and, furthermore, by this construction the knives are forced against the standing grain before it can be touched and forced down or borne away from the knives by the lower portions of the machine or the lower edge of the finger-beam.

$d^9\ d^9$ represent the guides over and under which the draper plays, and the carrying-rollers for the draper are secured to the sides of the frame-work in any suitable manner.

Upon the lower portion of the vertical part of the T-iron D, I place two friction-rollers, E E, (seen in detail at Fig. 10, Sheet 5,) which play between the flanges of the upper channel-iron, $C^2$.

Near the upper end of the T-iron D is bolted a bearing, E', which carries the friction-rollers $E^2\ E^2$, which play upon the back of the web of the channel-iron or guide $C^2$, and thus the T-iron D will always be held in its proper position and the sickle-bar and draper be kept perfectly horizontal when being raised or lowered by the chain $E^3$, which is secured to the upper end of the T-iron D and passes over the roller $d^2$, it being wound upon the pulley $d$, which is actuated by the spur-wheel $d'$ and worm-gear $C^3$; but this hand-wheel $d^4$ may be dispensed with, if desired, and on the shaft of the worm-gear may be placed a bevel-gear and friction-clutch; and this gear may be driven by a chain-connection with the pin-wheel $G^4$, which actuates the upper roller of the header-draper.

To the upright portion of the T-iron are secured standards F, and about midway the height of these standards I pivot arms F', their outer ends being provided with bearings for the shaft of the reel $F^2$.

Figures 10, 11:
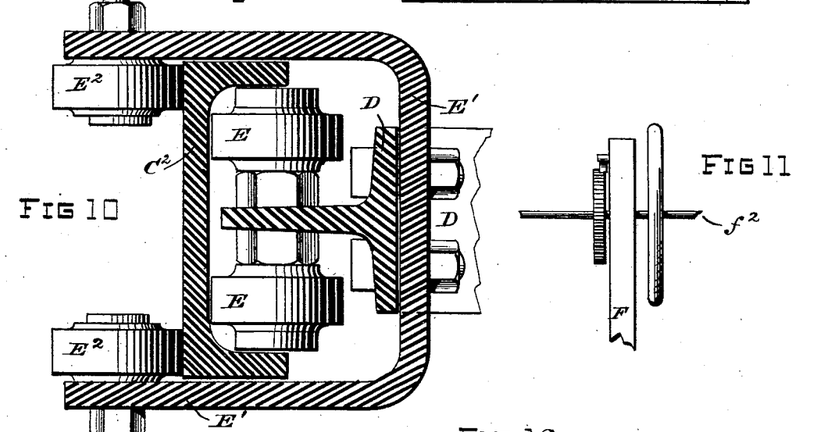
Fig. 10, Sheet 5, is a sectional plan view of the guide-rollers or friction-wheels, together with their supporting-irons on the lifting device of the header.
Fig. 11, Sheet 5, is a detail view, showing the mechanism for regulating the height of the reel of the header.
Figure 12:
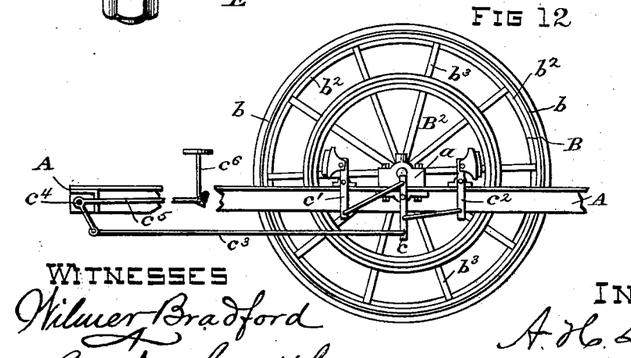
Fig. 12, Sheet 5, is a side view, showing one of the driving-wheels and the brake mechanism thereof.
Figure 13:
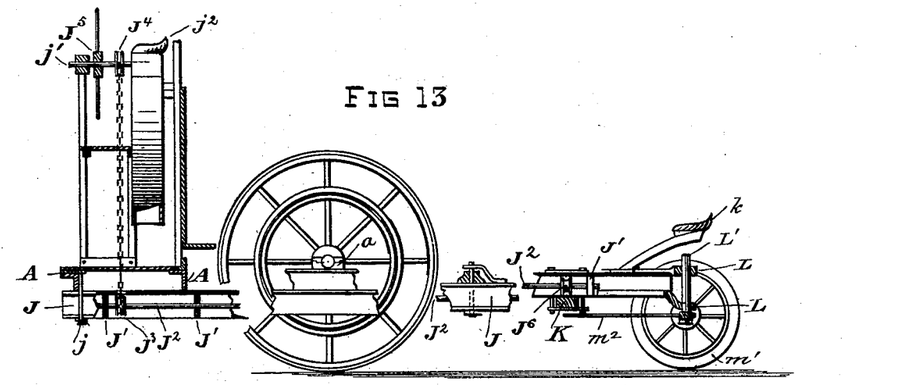
Fig. 13, Sheet 6, is a sectional side view, partly broken away, showing the steering mechanism.
Figure 14:
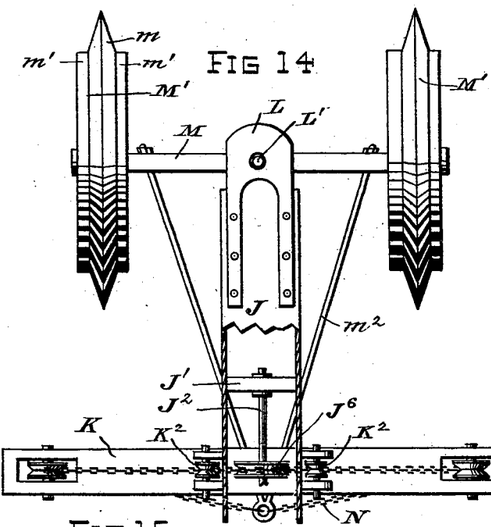
Fig. 14, Sheet 6, shows a plan view of the rudder-wheels and their operating mechanism.

Upon the reel-shaft $f$ is wound one end of a belt or cord, $f'$, while the other end is wound upon a shaft, $f^2$, which has its bearings secured to the top of the standards F F. This shaft is provided with a pawl and ratchet and hand-wheel, as shown in Fig. 11, Sheet 5, and by revolving this hand-wheel the height of the reel can be regulated.

A rotary motion is imparted to the reel by means of a chain-wheel, $f^3$, connected by an endless chain or belt to a wheel, $f^4$, placed upon the outer end of the shaft or axle of the driving-wheel B, Fig. 4, Sheet 4.

The shaft of the driving-wheel B is projected inwardly and provided with a bevel-wheel, G, which engages with bevel-pinions G' and $G^2$, both these pinions being provided with friction-clutches $G^3$.

The shaft of the bevel-pinion G' extends outward past the front edge of the main frame and is provided with a pin-wheel, $G^4$, as seen in Fig. 3, Sheet 3. Around this wheel an endless slack chain, $g$, is passed, which connects with the intermediate pin-wheel $G^5$, secured to the supporting framing for the reel, and this wheel is, in its turn, connected by the chain $g'$ to the pin-wheel $G^6$ upon the shaft which carries the roller actuating the draper of the header.

The object of having the slack chain $g$ is to secure for the draper a continuous motion, whether the header be set to cut high or low.

Figures 21, 22:
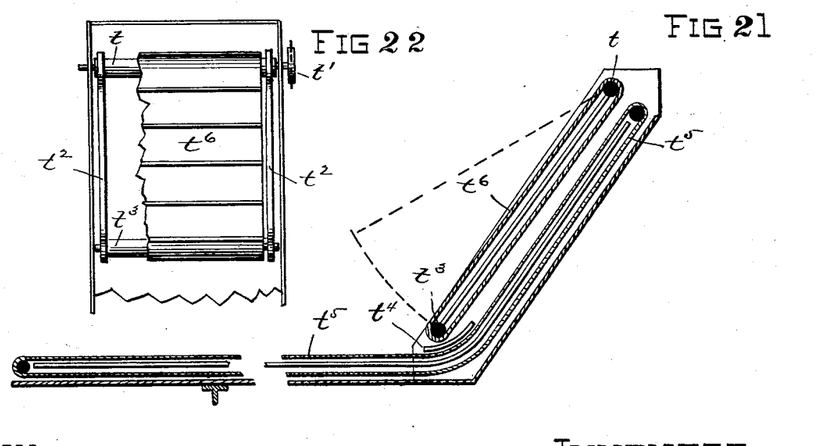
Fig. 21, longitudinal sectional view of header-draper.
Fig. 22, top view, partly broken away, of the swinging draper.

At the upper end of the inclined portion of the header-draper $t^5$, I place a roller, $t$, actuated by a pin-wheel, $t'$, and chain $g'$, and upon each end of the roller $t$, and within the side boards of the inclined portion of the draper, I secure the arms $t^2$, whose lower ends receive the journals of a roller, $t^3$. This swinging draper $t^6$ is pivoted at the upper roller, $t$, and rises and falls according to the thickness of the mass of material passing upon the incline of the header-draper, and it is prevented from falling down upon the header-draper by the guide-pieces $t^4$. By this construction it will be seen that no clogging up of the header-draper can take place, as all heavy foreign substances, such as weeds, sunflowers, &c., which have a tendency to fall down off the inclined portion of the header-draper, will be caught between the two drapers and drawn up and be delivered along with the grain onto a transverse draper (not shown) which, in turn, conveys it to the feeding-draper of the thrasher.

The shaft of the driving-wheel $B'$ is projected inwardly and provided with a cog-wheel, $H$, which engages with a pinion $H'$, upon a shaft, $H^2$, to which is keyed the cog-wheel, $H^3$, which engages with a pinion, $H^4$, provided with a friction-clutch, $H^5$, upon the shaft $H^6$, to which is keyed the miter-gear wheel, $H^7$, which engages with a miter-gear wheel, $H^8$, upon the shaft $I$. This shaft $I$ has its bearing, as shown in Fig. 3, Sheet 3, and Fig. 5, Sheet 4, and is projected outwardly in front of the edge of the main frame, and on its outer edge is keyed the pin-wheel $I'$.

Upon the shaft $I$, Fig. 5, Sheet 4, on each side of the pin-wheel $I'$, are placed the movable levers $I^2$ $I^2$, the upper ends of which embrace the movable shaft $I^3$, upon which the pin-wheels $I^4$ $I^5$ are keyed.

To the shaft $I^3$ are connected the movable levers $i$ $i$, the lower ends of which embrace the shaft $i'$, which is also provided with a pin-wheel, $I^2$, and connection is made between these wheels, as shown. By means of this arrangement the shaft $i'$ is caused to rotate, carrying with it the crank-wheel $i^3$, to which one end of the pitman of the sickle-bar is connected, and thereby impart to the sickle-bar a reciprocating movement.

Figure 15:
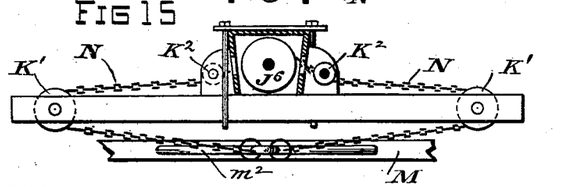
Fig. 15, Sheet 6, shows a side view of a portion of the steering mechanism.

On the under side of the main frame I attach by clamps $j$ the push-beam $J$, Fig. 3, Sheet 3, in such a manner as to be easily removable by simply taking off the clamps. This push-beam is made of plate-iron and of any desired length, and open on the under side, as seen in Fig. 15, Sheet 6. Within this beam I place bearings $J'$, in which revolves a shaft, $J^2$, which extends from end to end of the beam.

Figure 1:
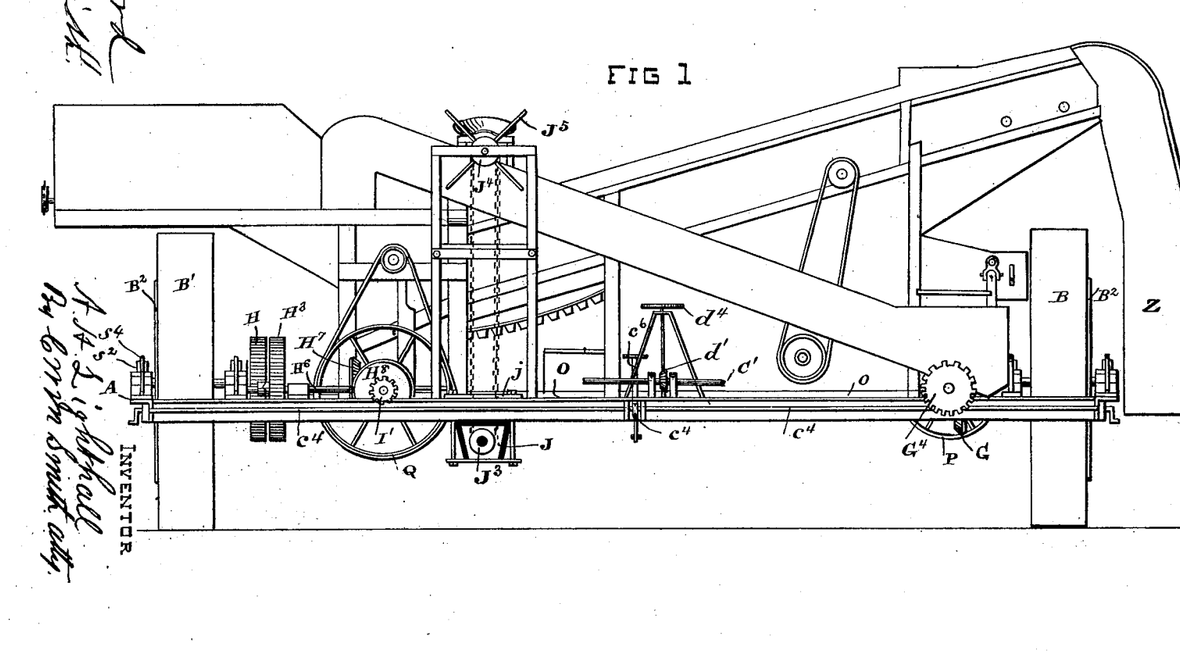
Figure 1 is a front elevation, showing the principal working parts of the thrasher.
Figure 2:
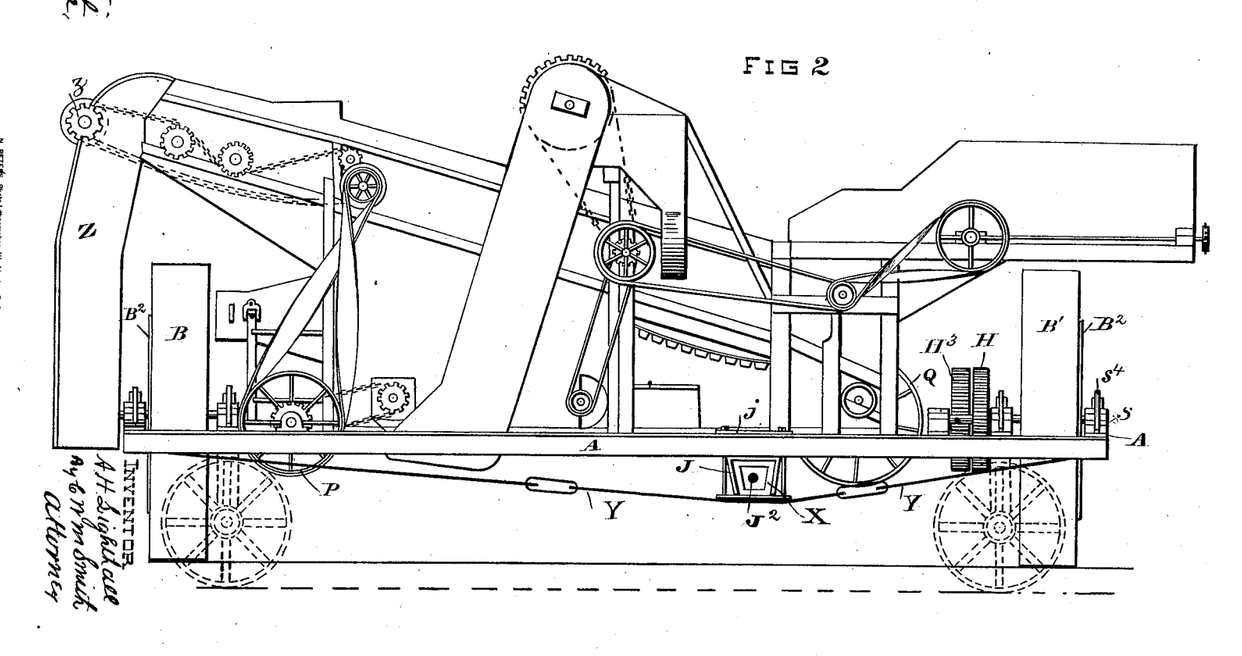
Fig. 2, Sheet 2, is a rear elevation of the same.

At a point near the ends of the side pieces of the main frame I attach a stay or truss rod, $Y$, which passes under the push-beam $J$ and assists in holding it firmly in place, and in order to prevent the crimping or buckling of the iron plates (of which the push-beam is composed) when the stay-rods and clamp-plates $j$ are tightened up, I place within the push-beam, and within that portion of it bounded by the stay-rods and clamping-bolts, the quadrangular box $X$. (Seen in side elevation in Fig. 2, Sheet 2, and in perspective in Fig. 17, Sheet 6.)

Upon the front end of the shaft $J^2$, I key a chain-wheel, $J^3$, which is connected to a chain-wheel, $J^4$, on a shaft, $j'$, which has its inner bearing in a block under the tiller-seat $j^2$, and this shaft is provided with a tiller-wheel, $J^5$, by which the tiller-man revolves by means of the connecting-wheels and chains the shaft $J^2$, upon the rear end of which is keyed the chain-wheel $J^6$.

To the under side of the push-beam, and beneath the chain-wheel $J^5$, I clamp the transverse bar $K$, the outer ends of which are slotted for the reception of the two chain-wheels $K'$ $K'$, while to the top of this bar, and adjoining the sides of the push-beam I, place the bearings for two guide-pulleys, $K^2$ $K^2$. The office of these pulleys is to draw down the chain $N$ over the top of the wheel $J^6$, and prevent all slipping between the chain $N$ and wheel $J^6$ when it is caused to rotate by the turning of the tiller-wheel $J^5$.

To the rear end of the push-beam I bolt a spring-seat, $k$, for the driver.

The animals are hitched to draw-bars secured at suitable points and in the usual manner to the push-beam.

Projecting outwardly from the rear end of the push-beam are the bearings $L$ $L$ for a vertical shaft, $L'$, welded or otherwise secured to the axle $M$ of the rudder-wheels $M'$ $M'$. These wheels are constructed with a central outwardly-projecting flange, $m$, on each side of which the tread $m'$ $m'$ is formed. This construction prevents the wheels from sinking in sandy or soft soil, and also insures a good hold upon the ground when they are moved upon their vertical pivoted point.

Between the pivotal point and the ends of the axle $M$, I attach the rods or hounds $m^2$, placed V-shaped, to the apex of which the chain $N$ is secured, so that by revolving the chain-wheel $J^6$ the point of the V formed by the rods is moved either to the right or left hand, causing the rudder-wheels to turn upon their vertical axis, and thus give direction to the movement of the machine.

Upon the two central longitudinal angle-irons composing the main frame are bolted the angle-irons $O$ $O$, thus forming a T-iron, and upon the web of this T-iron I set the standards $O'$ of the thrashing-machine, and bolt them to the flange, as shown in Fig. 7, Sheet 4. The advantage of this construction is that by removing the connections between the angle-iron $O$ and the main frame the thrasher may be easily removed from the header and used as a separate machine.

When it is desired to transport the machine over bridges or through parts which are too narrow to admit of the passage of the connected machine, I detach the header-draper and its connecting parts from the main frame, and by removing the two outside frame-pieces which receive the bearings of the two driving-wheels I am enabled to easily remove the said driving-wheels without interfering with the rest of the machinery, and then, by applying trucks (shown in dotted lines in Fig. 2, Sheet 2) the entire main frame may be transported over and through narrow places.

The shaft $p$ of the bevel-pinion $G^2$ is provided at its outer end with a band-wheel, P, which drives by intermediate gearing, such as is commonly used, the grain-carrier, straw-carrier, elevator, and shaker or shoe, while the band-wheel Q, upon the shaft I, drives the cylinder, transverse draper, and thrasher-draper.

To the upper end of the straw-carrier a chute is attached, which conveys the straw to a point below the working parts of the machine and distributes it upon the ground as the machine is pushed forward, and thus leaves it ready to be turned under as a manure. The upper end of this chute Z is provided with a straw-picker, $z$, which is actuated by any suitable gearing, and when revolved forces the straw, as it comes from the straw-carrier, down the chute; otherwise, owing to the light weight of the straw, the chute would become choked.

Having thus described my invention, what I claim, and desire to secure by Letters Patent, is—

1. In a combined header and thrasher, a main frame constructed of angle-iron joined at the corners of the frame by the overlapped ends of the horizontal flanges being bolted together and the bent end portion of the vertical flange of one piece being bolted to the vertical flange of the other piece, substantially as described.

2. In a combined thrasher and header, the combination, with the main frame thereof, of the perpendicular channel-iron $C^2$, having a colter or plow-point attached to its lower end, with the supporting frame-work D of the draper and sickle-bar, and its guide-wheels or friction-pulleys $E^2$ $E^2$, chain or belt $E^3$, roller $d^2$, pulley $d$, spur-wheel $d'$, and worm-gear $C^3$, constructed, arranged, and operating substantially as herein shown and described.

3. In a combined thrasher and header, a push-beam made of iron in the form shown, and having interior braces or stays, and attached by clamps to the main framing thereof, in the manner substantially as herein set forth and specified.

4. In a combined thrasher and header, the steering-gear consisting of the chain-wheels $J^3$ and $J^6$, secured upon a shaft, $J^2$, running within and the entire length of the push-beam J, and caused to operate upon the rudder-wheels M' M', pivoted to the rear end of the push-beam by a chain-connection with the hounds $m^2$, the whole being controlled and operated by the tiller-wheel $J^5$ and chain-wheel $J^4$, suitably connected to the chain-wheel $J^3$, all constructed, arranged, and operated substantially in the manner as herein shown and described.

5. In the steering-gear for combined headers and thrashers, rudder-wheels M' M', axle M, vertical shaft L', bearings L L, and hounds $m^2$, the said wheels being constructed with a centrally-projecting flange, $m$, and side flanges or treads, $m'$ $m'$, all constructed, arranged, and operating substantially as herein shown and set forth.

6. In a combined header and thrasher, the journal-boxes S S of the main driving-wheels B B', provided with a hollow projection, $s^2$, set-bolt $s^3$, and nut $s^5$, for the purpose of regulating the tension on the truss-rod $s^4$, all constructed, arranged, and operating substantially as herein shown and described.

In testimony that I claim the foregoing I have hereunto set my hand and seal this 26th day of August, 1880.

ALMERIN H. LIGHTHALL. [L. S.]

Witnesses:
C. W. M. SMITH,
WILMER BRADFORD.